(12) United States Patent
Kitazoe et al.

(10) Patent No.: US 8,180,335 B2
(45) Date of Patent: May 15, 2012

(54) SYSTEM INFORMATION MODIFICATION NOTIFICATION AND DETECTION IN WIRELESS COMMUNICATIONS

(75) Inventors: Masato Kitazoe, Hachiouji (JP); Nathan Edward Tenny, Poway, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 12/350,832

(22) Filed: Jan. 8, 2009

(65) Prior Publication Data

US 2009/0181661 A1    Jul. 16, 2009

Related U.S. Application Data

(60) Provisional application No. 61/020,705, filed on Jan. 11, 2008.

(51) Int. Cl.
*H04M 3/00* (2006.01)
*H04W 4/00* (2009.01)

(52) U.S. Cl. ......... 455/418; 455/434; 455/436; 370/328

(58) Field of Classification Search .............. 455/67.13, 455/466, 502, 418, 404.1, 434, 458, 450, 455/436, 438, 442; 370/328, 335, 332, 329, 370/331
See application file for complete search history.

(56) References Cited

U.S. PATENT DOCUMENTS

| | | | |
|---|---|---|---|
| 2004/0266461 A1* | 12/2004 | Beckmann et al. | 455/466 |
| 2005/0043046 A1* | 2/2005 | Lee | 455/502 |
| 2005/0195852 A1 | 9/2005 | Vayanos et al. | |
| 2006/0040655 A1 | 2/2006 | Kim | |
| 2006/0252377 A1* | 11/2006 | Jeong et al. | 455/67.13 |

FOREIGN PATENT DOCUMENTS

| | | |
|---|---|---|
| JP | 2007522776 A | 8/2007 |
| JP | 2007533248 A | 11/2007 |
| JP | 2008503151 A | 1/2008 |
| JP | 2008535365 A | 8/2008 |
| WO | WO2005117297 A1 | 12/2005 |

OTHER PUBLICATIONS

Definition of Scheduling Unit (SU); 3GPP Draft; R2-075542, 3rd Generation Partnership Project (3GPP), Mobile Competence Centre, Dec. 13, 2007.
International Search Report and Written Opinion, PCT/US2009/030669, International Searching Authority, European Patent Office, May 13, 2009.
Universal Mobile Telecommunications System (UMTS); Radio Resource Control (RRC); Protocol Specification, 3GPP TS 25331 Version 770, Jan. 2008.

(Continued)

Primary Examiner — Kiet Doan
(74) Attorney, Agent, or Firm — Peng Zhu

(57) ABSTRACT

Systems and methodologies are described that facilitate notifying and detecting system information block (SIB) modification in subsequent modification periods. Access points can advertise information in a current SIB indicating a subsequent modification period in which the SIB will be modified. Devices can receive the SIB and process the information to determine whether the SIB will be modified and in which modification period. This mitigates undesirable affects of utilizing paging to indicate SIB modification since devices read the SIB upon entering a cell, switching from active to idle mode, etc.

44 Claims, 11 Drawing Sheets

OTHER PUBLICATIONS

Ericsson, "Transport of system information over Iub", TSG-RAN Working Group 3 meeting 7TSGW3#7(99)B63, R3-99B63, France, Sofia Antipolis, Sep. 20-24, publ. Sep. 15, 1999, pp. 1-6, retrieved from the Internet on http://www.3gpp.org/ftp/tsg_ran/WG3_1u/TSGR3_07/Docs/zips/.

Taiwan Search Report—TW098100864—TIPO—Feb. 5, 2012.

* cited by examiner

SYSTEM INFORMATION MODIFICATION NOTIFICATION AND DETECTION IN WIRELESS COMMUNICATIONS

CROSS-REFERENCE TO RELATED APPLICATIONS

This application claims the benefit of U.S. Provisional Patent application Ser. No. 61/020,705 entitled "SYSTEM INFORMATION MODIFICATION NOTIFICATION AND DETECTION IN WIRELESS COMMUNICATIONS" which was filed Jan. 11, 2008. The entirety of the aforementioned application is herein incorporated by reference.

BACKGROUND

I. Field

The following description relates generally to wireless communications, and more particularly to notification and related detection of system information modification.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In addition, mobile devices can travel over a wireless network receiving wireless access service from various base stations. Thus, a mobile device reselects cells of the various base stations as it travels based on transmit power or other metrics. In addition, a mobile device, operating in idle mode, receives system information blocks (SIB) from the base stations that define information such as common channel configurations, idle mode mobility parameters, system acquisition information, etc. related to the base station. The base stations can modify the system information within scheduled modification periods and currently notify mobile devices of the scheduled modification period using paging (e.g., over a discontinuous receiver (DRX) for low-power duty cycle reception). Once notified, the mobile devices process the change for subsequent utilization (e.g., system acquisition when switching from idle to active mode).

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating indicating, within a system information block (SIB) transmitted in a current modification period, SIB modification in a subsequent modification period. In this regard, mobile devices can evaluate a current SIB to determine whether the block will be modified in a subsequent modification period. If so, the mobile devices can accordingly process the modification in the indicated modification period.

According to related aspects, a method for detecting subsequent modification of a SIB is provided. The method includes receiving a current SIB in a current modification period and analyzing one or more parameters of the current SIB and/or other SIBs related to modifying the current SIB. The method also includes determining whether the current SIB is modified in a subsequent modification period based at least in part on the one or more parameters.

Another aspect relates to a wireless communications apparatus. The wireless communications apparatus can include at least one processor configured to receive a SIB from an access point and determine one or more parameters in the SIB and/or other SIBs related to modification of the SIB in a subsequent modification period. The processor is further configured to receive a modified SIB in the subsequent modification period according to the one or more parameters. The wireless communications apparatus also comprises a memory coupled to the at least one processor.

Yet another aspect relates to a wireless communications apparatus that facilitates detecting future modification of a SIB. The wireless communications apparatus can comprise means for receiving a SIB comprising one or more parameters related to subsequent modification of the SIB and/or a disparate SIB. The wireless communications apparatus can additionally include means for determining whether the SIB and/or the disparate SIB is modified in a subsequent modification period based at least in part on the one or more parameters.

Still another aspect relates to a computer program product, which can have a computer-readable medium including code for causing at least one computer to receive a current SIB in a current modification period. The computer-readable medium can also comprise code for causing the at least one computer to detect one or more parameters of the current SIB and/or other SIBs related to modifying the current SIB. Moreover, the computer-readable medium can comprise code for causing the at least one computer to determine that the current SIB is modified in a subsequent modification period based at least in part on the one or more parameters.

Moreover, an additional aspect relates to an apparatus. The apparatus can include a SIB reader that receives a SIB from an access point and a SIB modification analyzer that determines modification of the SIB in a subsequent modification period based at least in part on one or more parameters in the SIB and/or other SIBs. The apparatus can further include a SIB modification employer that configures the SIB reader to receive the SIB in the subsequent modification period.

According to a further aspect, a method that facilitates notification for modifying a SIB in a subsequent modification period is provided. The method includes generating a SIB comprising one or more parameters related to idle mode communication over a wireless communication network and determining a subsequent modification period for altering the SIB. The method further includes inserting one or more parameters in the SIB and/or other SIBs to indicate altering the SIB in the subsequent modification period.

Another aspect relates to a wireless communications apparatus. The wireless communications apparatus can include at least one processor configured to create a SIB comprising one or more parameters related to providing wireless network access. The processor is further configured to select a future modification period for modifying the SIB and set one or more parameters in the SIB and/or other SIBs indicating the modification in the future modification period. The wireless communications apparatus also comprises a memory coupled to the at least one processor.

Yet another aspect relates to a wireless communications apparatus for indicating modification of a SIB in a subsequent modification period. The wireless communications apparatus can comprise means for creating a SIB comprising one or more parameters related to providing wireless access. The wireless communications apparatus can additionally include means for determining a subsequent modification period for adjusting the SIB and means for initializing a parameter in the SIB and/or other SIBs to indicate the adjustment in the subsequent modification period.

Still another aspect relates to a computer program product, which can have a computer-readable medium including code for causing at least one computer to generate a SIB comprising one or more parameters related to idle mode communication over a wireless communication network. The computer-readable medium can also comprise code for causing the at least one computer to select a subsequent modification period for altering the SIB. Moreover, the computer-readable medium can comprise code for causing the at least one computer to modify one or more parameters in the SIB and/or other SIBs to indicate altering the SIB in the subsequent modification period.

Moreover, an additional aspect relates to an apparatus. The apparatus can include a SIB generator that creates a SIB comprising one or more parameters related to communicating with the apparatus and a SIB modification specifier that adjusts a parameter in the SIB and/or other SIBs to indicate modification of the SIB in a subsequent modification period. The apparatus can further include a SIB modification instantiator that configures the SIB generator to create a modified SIB for transmission in the subsequent modification period.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
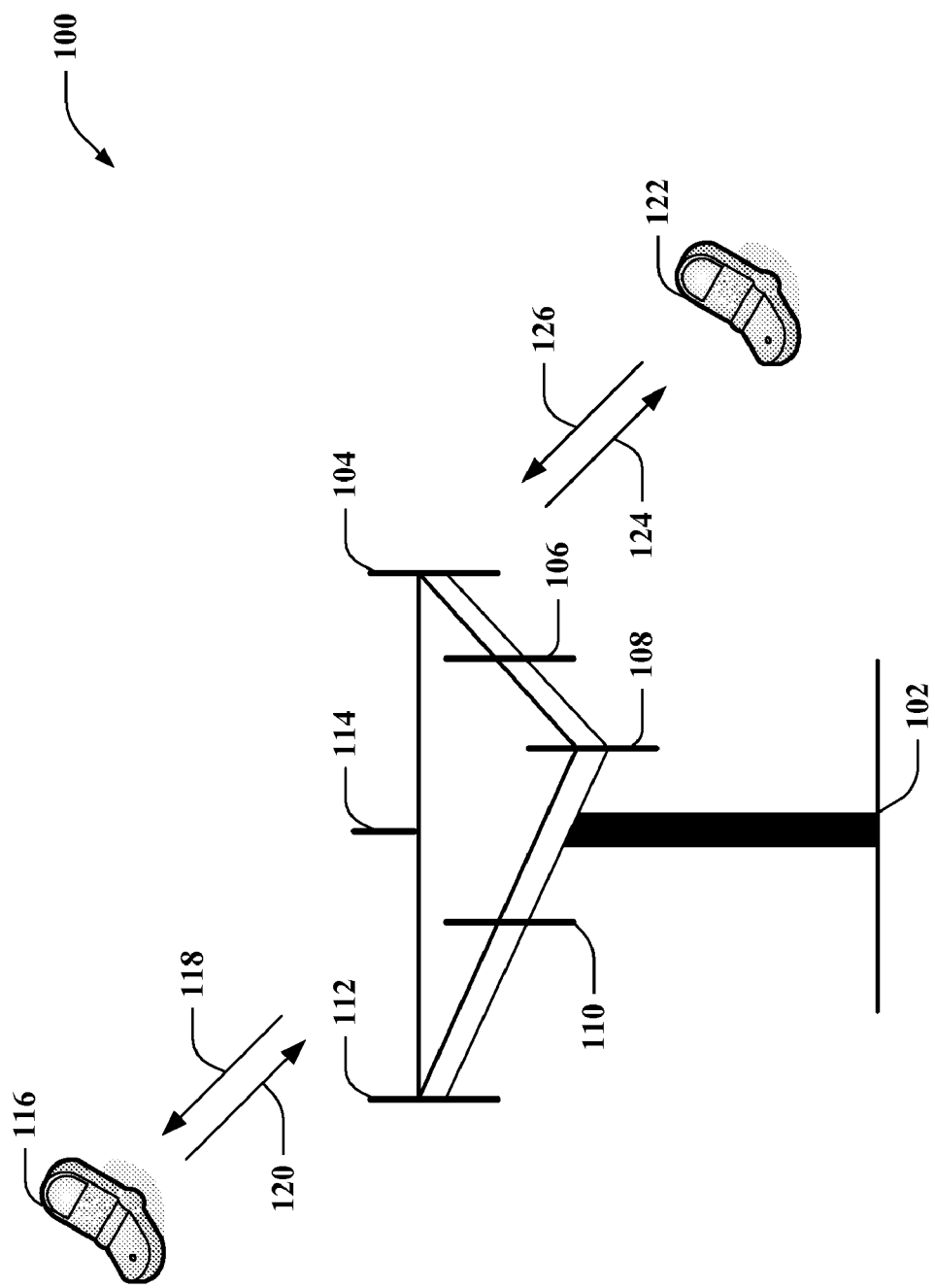
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices; in one example, OFDM can be utilized in this regard. The mobile devices 116 and 122 can travel over a wireless coverage area such that the mobile devices 116 and 122 can reselect cells related to the base station 102 or other base stations (not shown) to provide continuous coverage. In addition, the mobile devices 116 and 122 can operate in an idle and/or active mode. For example, in an idle mode, the mobile devices 116 and 122 can still perform cell reselection such that upon switching to active mode, the mobile devices 116 and 122 can communicate with a related base station (e.g., base station 102) without performing previously required system acquisition procedures. To facilitate this behavior, in one example, the base station 102 can transmit a system information block (SIB) to the mobile devices 116 and 122 that comprises information related to common channel configuration (e.g., random access channel, etc.), idle mode mobility (e.g., neighboring frequencies for measurement, other criteria to utilize for mobility, etc.), system acquisition, and/or the like. The SIBs can be related to scheduling units (SU) in a radio resource control (RRC) message, for instance.

According to an example, the base station 102 can transmit the SIBs in scheduled modification periods such that the block cannot be modified within a current modification period. Rather, the base station 102 can be required to first notify mobile devices 116 and 122 of the modification and wait until the following modification period to effectuate the modification. It is to be appreciated that the mobile devices 116 and 122 as well as the base station 102 are scheduled such that the mobile devices 116 and 122 are aware of the same modification period boundaries. Previously, paging has been utilized to accomplish modification notification. Where the mobile devices 116 and 122 enter a cell of the base station 102 in idle mode after the last page, however, the system information can be modified by the base station 102 in the next modification period, and the mobile devices 116 and 122 utilize the previously received system information in the next modification period; this system information is potentially stale, since the mobile devices 116 and 122 missed the page that would have notified them of the change.

Thus, to mitigate this undesirable effect of paging, the base station 102 can indicate, within the current SIB, system information modification in the SIBs transmitted in a subsequent modification period, which can be the next or a future modification period other than the current modification period. In this regard, mobile devices 116 and 122 initially establishing idle mode communication with the base station 102 can receive the current SIB and determine whether the system information changes in the current SIB or one or more disparate SIBs in the next or a subsequent modification period. This mitigates the dependence on reception of paging, as the mobile devices 116 and 122 receive and evaluate the SIB of the base station 102 upon establishing idle mode communication therewith. In addition, the mobile devices 116 and 122 can possess current SIB and related modification information in this regard. It is to be appreciated that the mobile devices 116 and 122 can commence reception of system information from the base station 102 by reselecting to a cell related to the base station 102, switching from active to idle mode while communicating in a cell related to the base station 102, and/or the like.

Figure 2:
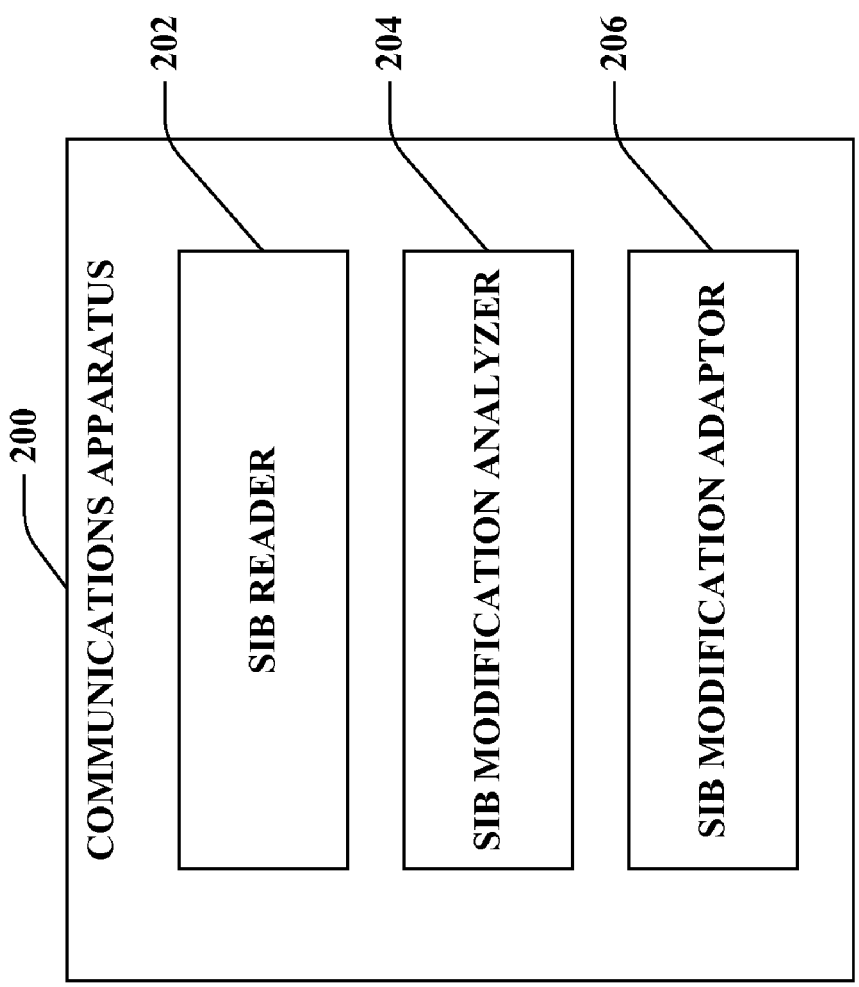
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a SIB reader 202 that receives and evaluates one or more SIBs from one or more related access points (not shown), a SIB modification analyzer 204 that can evaluate a SIB modification parameter in the SIB to determine whether the system information is modified in the next or another subsequent modification period, and a SIB modification adaptor 206 that can receive the modified SIB in the subsequent modification period and accordingly configure the communications apparatus 200 with the modified information.

According to an example, the SIB reader 202 can receive SIBs from various access points over a wireless network. The SIBs can be read while the communication apparatus 200 operates in an idle mode, and the SIBs can include information related to system acquisition, idle mode mobility, common channels, and/or the like, as described. In addition, the SIBs can comprise information regarding modification of the SIB or other SIBs in a subsequent modification period. This can be a flag, for example indicating whether the SIB will be modified in a next modification period, a period counter indicating modification in a future modification period, another identifier of the modification period, etc. The SIB modification analyzer 204 can determine one or more modification periods during which the SIB will be modified based on the flag, counter, or otherwise. Accordingly, the SIB modification adaptor 206 can configure the communications apparatus 200 and/or SIB reader 202 to receive the modified SIB in the appropriate modification period(s). As described, the communications apparatus 200 can subsequently utilize the modified SIB information, for example, to communicate over a common channel, perform idle mode mobility, and/or the like. In addition, the communications apparatus 200 can update internal parameters based at least in part on the modified SIB.

Figure 3:
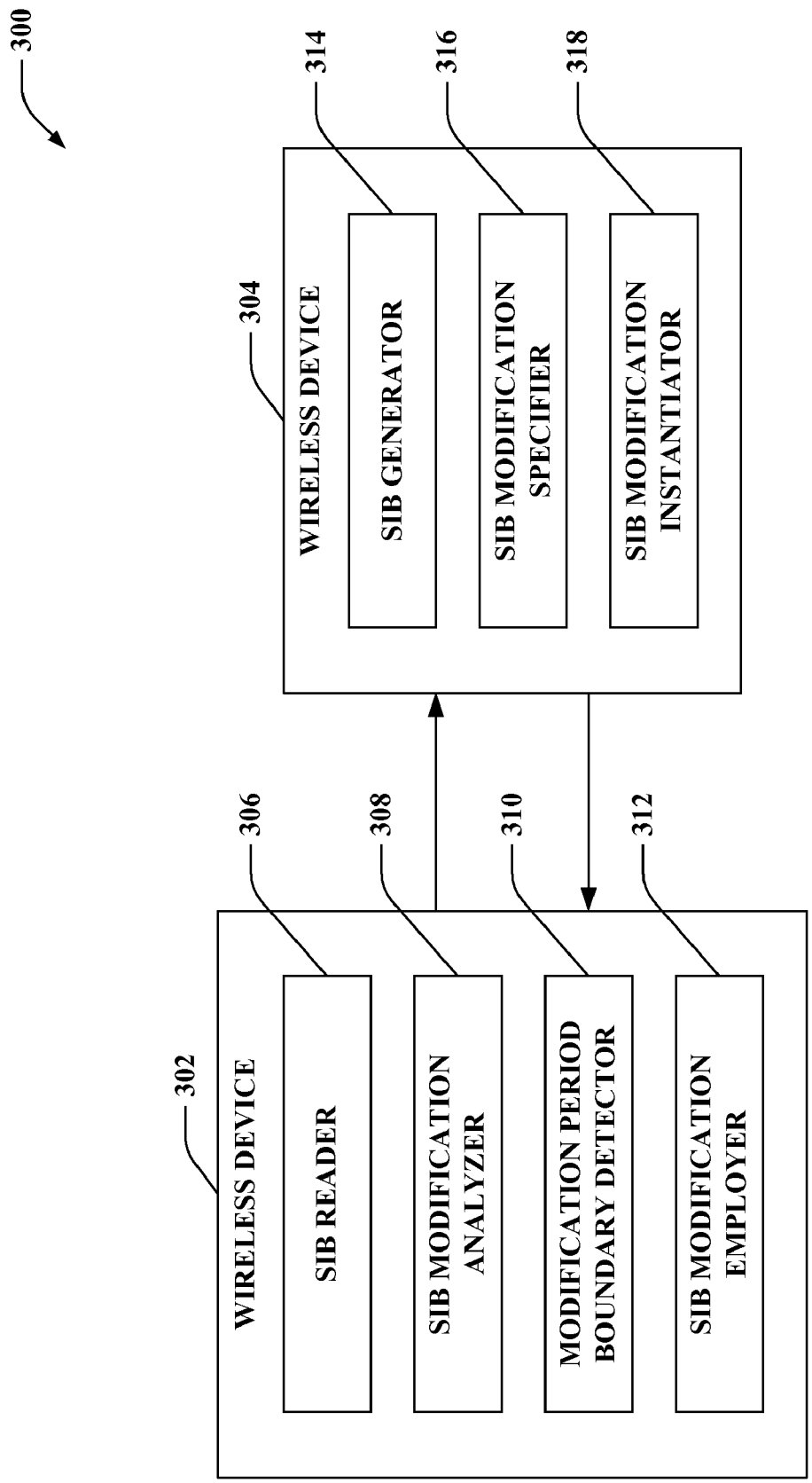
FIG. 3 is an illustration of an example wireless communications system that effectuates notifying and determining system information block (SIB) modification period information.

Now referring to FIG. 3, illustrated is a wireless communications system 300 that facilitates notification and detection of SIB modification. Wireless device 302 and/or 304 can be a mobile device (including not only independently powered devices, but also modems, for example), a base station, and/or portion thereof. In one example, wireless device 302 can transmit information to wireless device 304 over a reverse link or uplink channel; further wireless device 302 can receive information from wireless device 304 over a forward link or downlink channel or vice versa. In yet another example, the wireless devices 302 and 304 can communicate using peer-to-peer or ad hoc technology where the devices 302 and 304 are of similar type. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless device 302 can be present in the wireless device 304 as well and vice versa, in one example; the configuration depicted excludes these components for ease of explanation.

Wireless device 302 includes a SIB reader 306 that can receive a SIB from the wireless device 304, a SIB modification analyzer 308 that can detect a SIB modification parameter or flag in the SIB, a modification period boundary detector 310 that can determine an end and/or start of one or more modification periods, and a SIB modification employer 312 that can configure the wireless device 302 and/or SIB reader 306 to receive a modified SIB in a subsequent modification period. It is to be appreciated that the modification periods can be of the same or varying size, in one example. In either case, the modification period boundary detector 310 can determine where modification periods start and end.

Wireless device 304 includes a SIB generator 314 that creates SIBs for transmission to one or more disparate wireless devices, such as wireless device 302, a SIB modification specifier 316 that can determine a modification period for the SIB, similarly to the modification period boundary detector 310, and populate a current SIB with a flag, counter, or other parameter indicating the modification information for a subsequent modification period, and a SIB modification instantiator 318 that can configure the wireless device 304 and/or SIB generator 314 to transmit SIBs according to the modification in the subsequent modification period.

According to an example, the SIB generator 314 can create a SIB comprising information regarding idle mode parameters, such as idle mobility mode information, common channel configuration parameters, system acquisition information, and/or the like, as described. The SIB modification specifier 316 can insert a SIB modification parameter in the SIB. As described, the SIB modification parameter can be a flag indicating whether or not the SIB will be modified in the next modification period, a counter indicating a number of modification periods until the SIB is modified, an identifier indicating one or more SIBs that are modified in one or more subsequent modification periods (as well as the respective modification periods, in one example), etc. The wireless device 304 can transmit the SIB over a wireless network. Where the modification parameter indicates a modified SIB in a subsequent modification period, the SIB modification instantiator 318 can configure the wireless device 304 and/or SIB generator 314 to utilize the modified SIB information in the subsequent modification period.

The SIB reader 306, in one example, can process the SIB to extract, determine, or infer one or more parameters. As described, the SIB reader 306 can receive SIBs when the wireless device 302 is operating in an idle mode. Thus, the SIB reader 306 can receive a current SIB when switching from active to idle mode. In another example, as described, the SIB reader 306 can receive a current SIB when initializing communication with a disparate wireless device (e.g., entering a cell related thereto and/or the like). Once received, the SIB modification analyzer 308 can discern a modification parameter in the SIB. For example, the modification parameter can be a flag indicating that the SIB will be modified in the next modification period, as described. The modification period boundary detector 310 can determine the start of the next modification period, and the SIB modification employer 312 can set the wireless device 302, or SIB reader 306, to receive the modified SIB, in the next modification period, for instance. Thus, the wireless device 302 can prepare to update stored parameters related to the SIB, in one example, for future utilization in communicating with the wireless device 304.

According to another example, the modification parameter can be a flag indicating that the SIB will not be modified in the next modification period. In this example, the SIB modification employer 312 can take no action with respect to the wireless device 302 and/or SIB reader 306. In another example, the SIB modification employer 312 can notify the SIB reader 306 of the lack of change for the next modification period. In yet another example, the modification parameter can be a counter indicating a number of modification periods until the SIB will be modified. Thus, the SIB modification analyzer 308 can utilize the modification period boundary detector 310 to detect when each modification period starts or ends and can tally expired modification periods. Thus, when the SIB modification analyzer 308 has counted a number of expired modification periods matching the modification parameter (or the modification parameter minus 1, for example), the SIB modification employer 312 can configure the wireless device 302 and/or SIB reader 306 to receive the modified SIB in the following modification period. The modification parameter can also relate to SIBs that will be modified in one or more subsequent modification periods. For example, the parameter can indicate SIBs modified in a next period, SIBs with respective modification period counters, a combination thereof, and/or the like, for example. The wireless device 302 can utilize this information, as described above, to determine one or more SIBs modified for a given modification period.

Since the wireless device 302 receives a current SIB when switching to idle mode and/or initializing communications with the wireless device 304, it can possess information regarding potential modification up front instead of waiting for paging, as described previously. This mitigates behavior causing the wireless device 302 to have out-dated modification information when initializing communication with the wireless device 304 or switching from active to idle mode after the last paging, as described. It is to be appreciated that the wireless device 302 can possess current modification information going forward by evaluating subsequent SIBs transmitted by the wireless device 304, as shown above.

Figure 4:
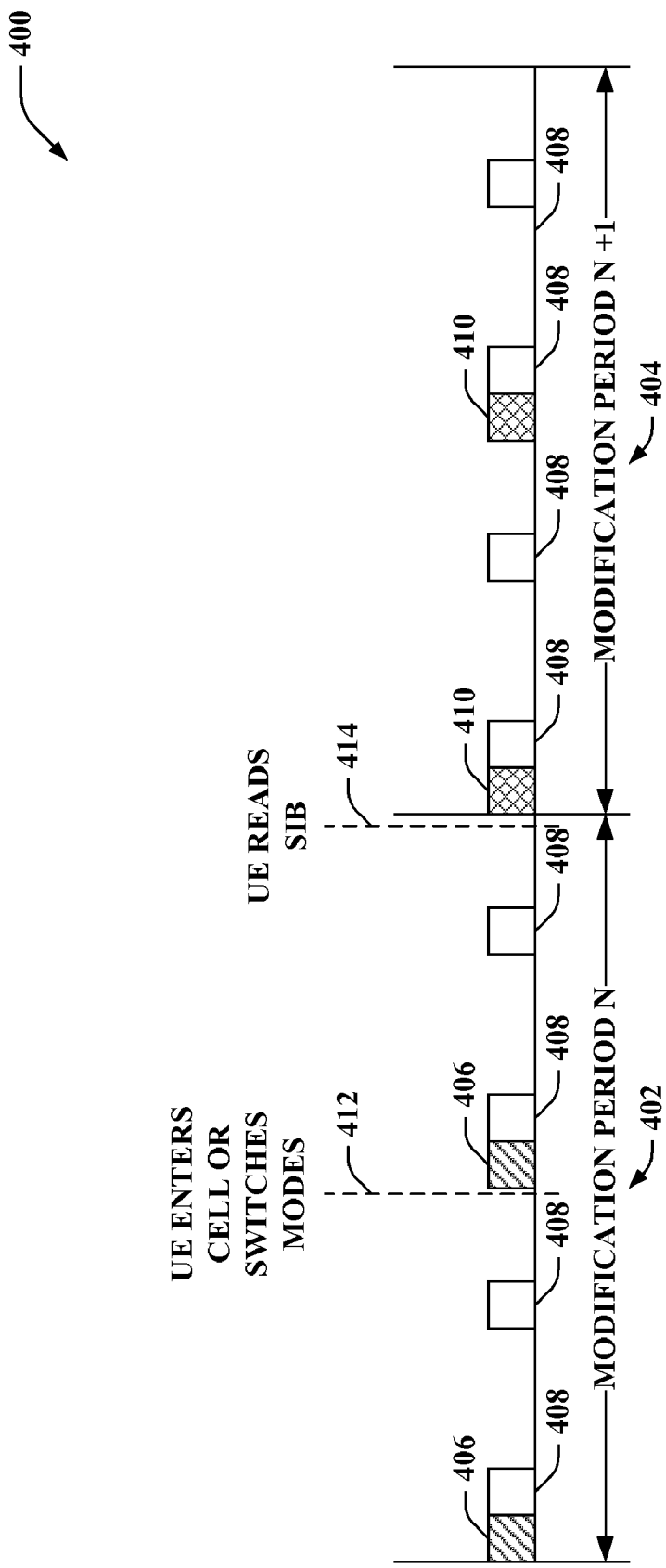
FIG. 4 is an illustration of an example transmission block over which SIB information is transmitted.

Turning now to FIG. 4, an example transmission block 400 is displayed that illustrates a plurality of SIBs transmitted over a plurality of modification periods. The transmission block 400 includes modification period N 402 and modification period N+1 404 over which various SIBs can be transmitted. As depicted, SIB 408 is transmitted at multiple instances over modification period N 402. As described, an access point or other access service provider can transmit the SIBs to provide idle mode information for connecting to the access service provider. In addition, SIB 406 is transmitted at multiple instances over modification period N 402. In modification period N+1 404, however, SIB 406 is modified as SIB 410, which is transmitted at multiple instances over the modification period N+1 404 as well as SIB 408. In this regard, at least the later instance of SIB 406 in modification period N 402 can be required to indicate the modification in the next modification period N+1 404. As described, the SIB 406 can additionally or alternatively explicitly specify modification period N+1 404, in a counter or other identifying parameters, as the modification period where the SIB 406 is modified to SIB 410.

According to an example, a UE can enter a cell related to the access service provider, switch from an active to idle mode, and/or the like at time 412 in the transmission block. At time 414, the UE can complete reading of the SIB 406 and/or 408. Thus, since the SIB 406 and/or other SIBs indicate subsequent alteration of the SIB 406 in the modification period N+1 404, the UE can configure itself to receive the modified SIB 410 in modification period N+1 404. The UE can accordingly utilize the modified SIB to update parameters, and/or the like. It is to be appreciated that where the UE reads the SIB in the modification period N+1 404 (not shown), it can read the modified SIB 410 so that it has the current SIB information. This mitigates issues caused by paging where a page can occur before the UE reads the SIB 406 or the UE does not have any occasions for receiving paging within modification period N 402 causing the UE to enter the modification period N+1 404 without the proper SIB information.

Figure 5:
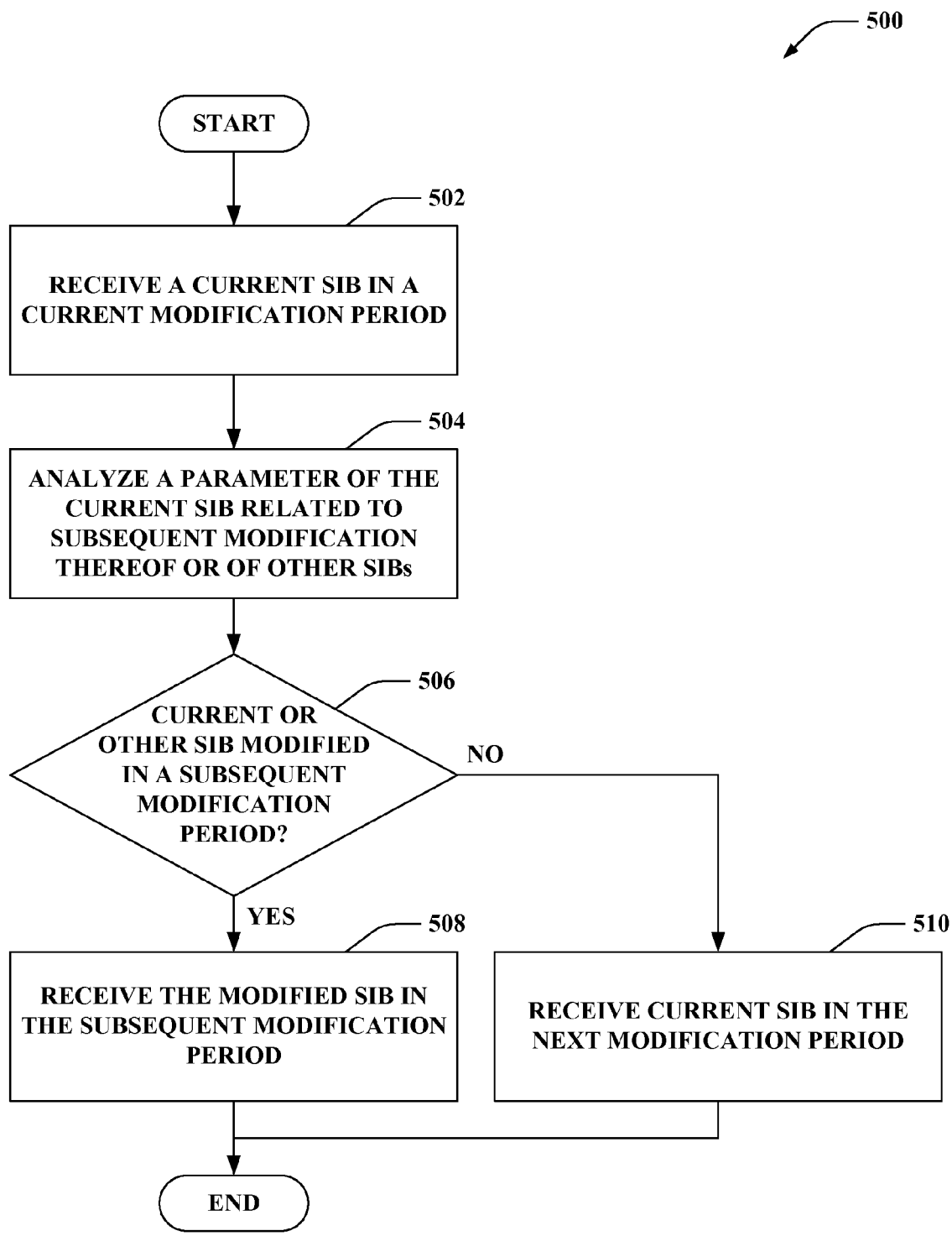
FIG. 5 is an illustration of an example methodology that facilitates determining SIB modification periods in which the SIB is modified.
Figure 6:
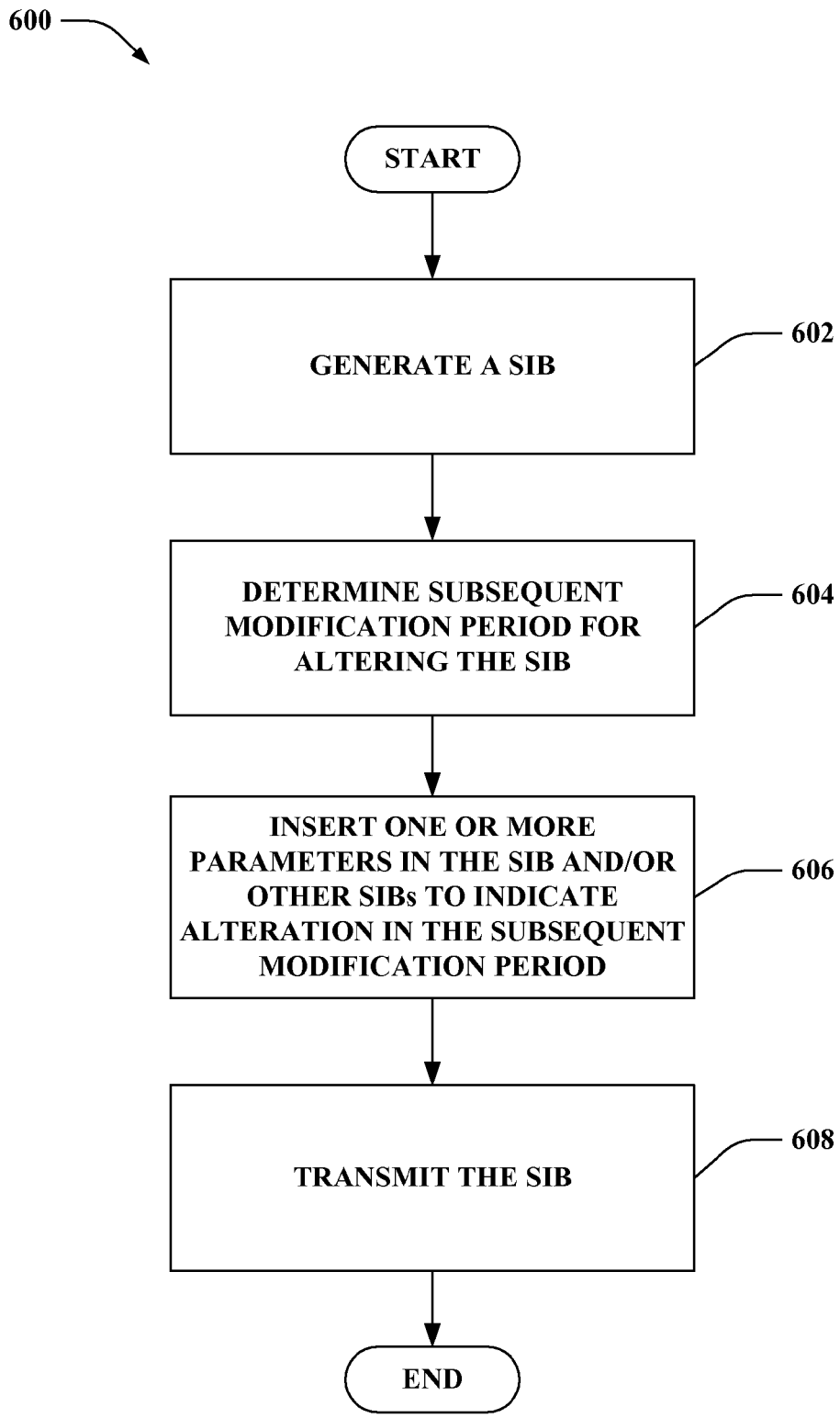
FIG. 6 is an illustration of an example methodology that facilitates indicating SIB modification periods for modifying the SIB.

Referring to FIGS. 5-6, methodologies relating to indicating and detecting SIB modifications over wireless communication networks are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates detecting subsequent SIB modification in a current SIB modification period is displayed. At 502, a current SIB is received in a current modification period. As mentioned, SIBs can be required to provide indications of modification in at least one modification period before the modification is to occur. This gives devices an opportunity for configuring to receive the modified SIB. At 504, a parameter of the current SIB related to subsequent modification thereof or of other SIBs, as described, is analyzed. Thus, the current SIB can comprise information regarding modification. As described above, this is an improvement over paging mechanisms as devices can read SIBs as part of initial communication establishment. The parameter can be a flag indicating whether the SIB is modified in the next modification period, a counter or variable indicating a modification period in which the SIB will be modified, and/or the like.

At 506, it is determined whether the current or other SIB is modified in a subsequent modification period; this can be based on the parameters, as described above. If the current SIB is modified in the subsequent modification period, then at 508, the modified SIB can be received in the subsequent modification period. In one example, this can require a configuration alteration and can result in modifying one or more local parameters or settings based on the modified SIB. It is to be appreciated that the subsequent modification period, as described, can be a next or other subsequent period as indicated by the parameter. If the parameter does not indicate the current SIB as modified in a subsequent modification period, at 510, the current SIB can be received in the next modification period, and each following modification period until it is modified, as indicated at least in part by the parameter.

Turning to FIG. 6, illustrated is a methodology 600 that facilitates indicating SIB modification in a subsequent modification period. At 602 a SIB is generated. As described, the SIB can comprise one or more parameters that can be utilized to initialize communications, such as idle mode mobility information, system acquisition information, common channel configurations, etc. At 604, a subsequent modification period for altering the SIB can be determined. As described, this can be required to be a subsequent modification period other than a current modification period. At 606, one or more parameters can be inserted in the SIB and/or other SIBs to indicate alteration in the subsequent modification period. Thus, upon reading the SIB, a device can determine that the SIB will change in the subsequent modification period (which can be the next modification period, in one example). At 608, the SIB can be transmitted over a wireless communications network or otherwise to one or more devices.

It will be appreciated that, in accordance with one or more aspects described herein, inferences can be made regarding determining a modification period in which the SIB can be modified, modification period boundaries, etc., as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
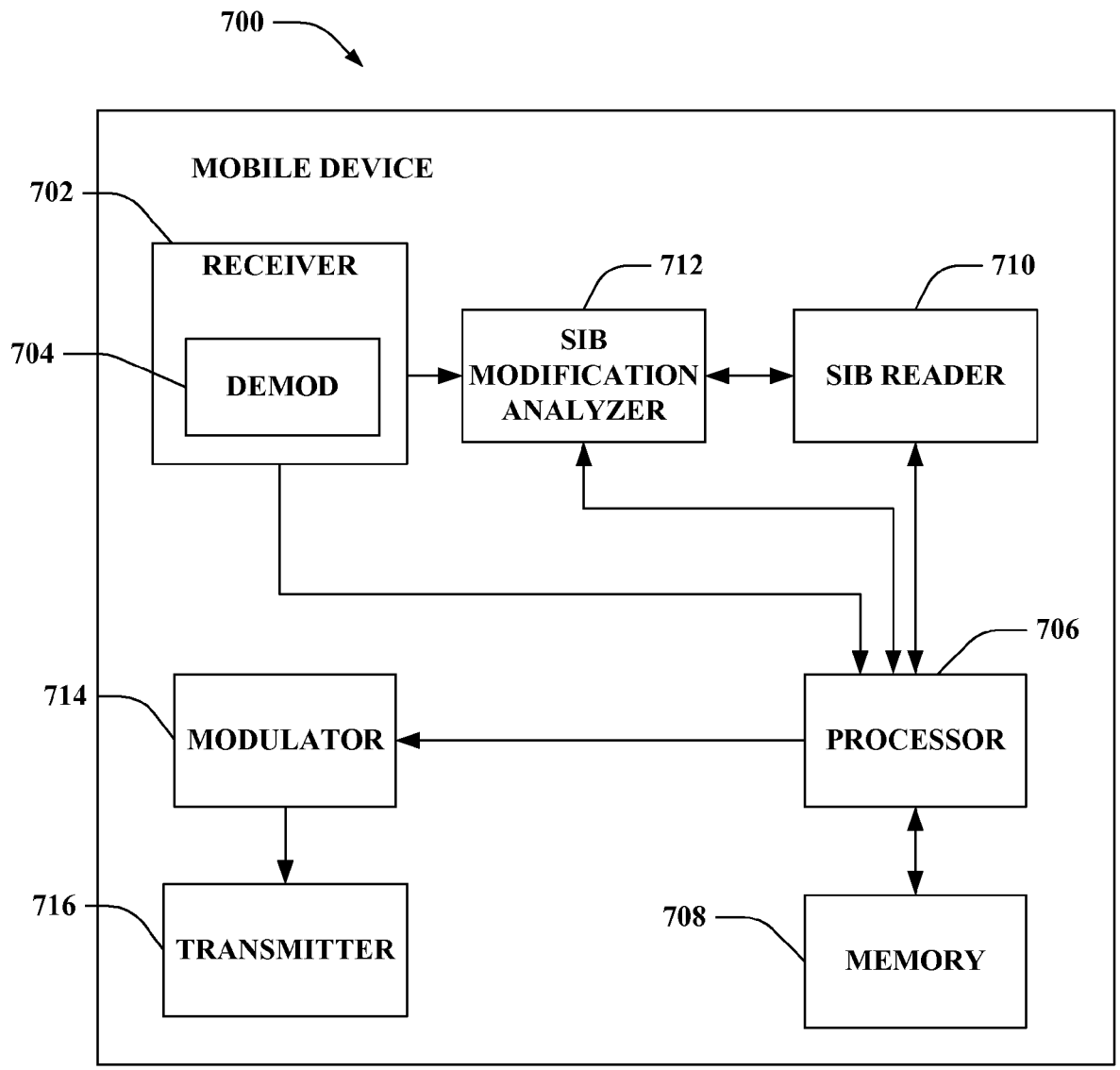
FIG. 7 is an illustration of an example mobile device that determines future modification of the SIB based on a current SIB.

FIG. 7 is an illustration of a mobile device 700 that facilitates determining modification periods within which a SIB is modified. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

The processor 706 can further be operatively coupled to a SIB reader 710 that receives one or more SIBs from one or more access points over a modification period. As described, the SIBs can indicate parameters for communicating with the access point in an idle mode. Moreover, however, the SIBs can comprise one or more parameters indicating whether the SIB changes in a subsequent modification period. The processor can also be coupled to a SIB modification analyzer 712 that can determine whether the SIB will be modified and in which modification period relative to the current modification period. Thus, the mobile device 700 can subsequently be configured to receive the modified SIB in the indicated modification period. In addition, the mobile device 700 can receive the modified SIB and utilize the parameters to update one or more locally stored parameters, establish active mode communications with the access point, and/or the like. Mobile device 700 still further comprises a modulator 714 and transmitter 716 that respectively modulate and transmit signals to, for instance, a base station, another mobile device, etc. Although depicted as being separate from the processor 706, it is to be appreciated that the SIB reader 710, SIB modification analyzer 712, demodulator 704 and/or modulator 714 can be part of the processor 706 or multiple processors (not shown).

Figure 8:
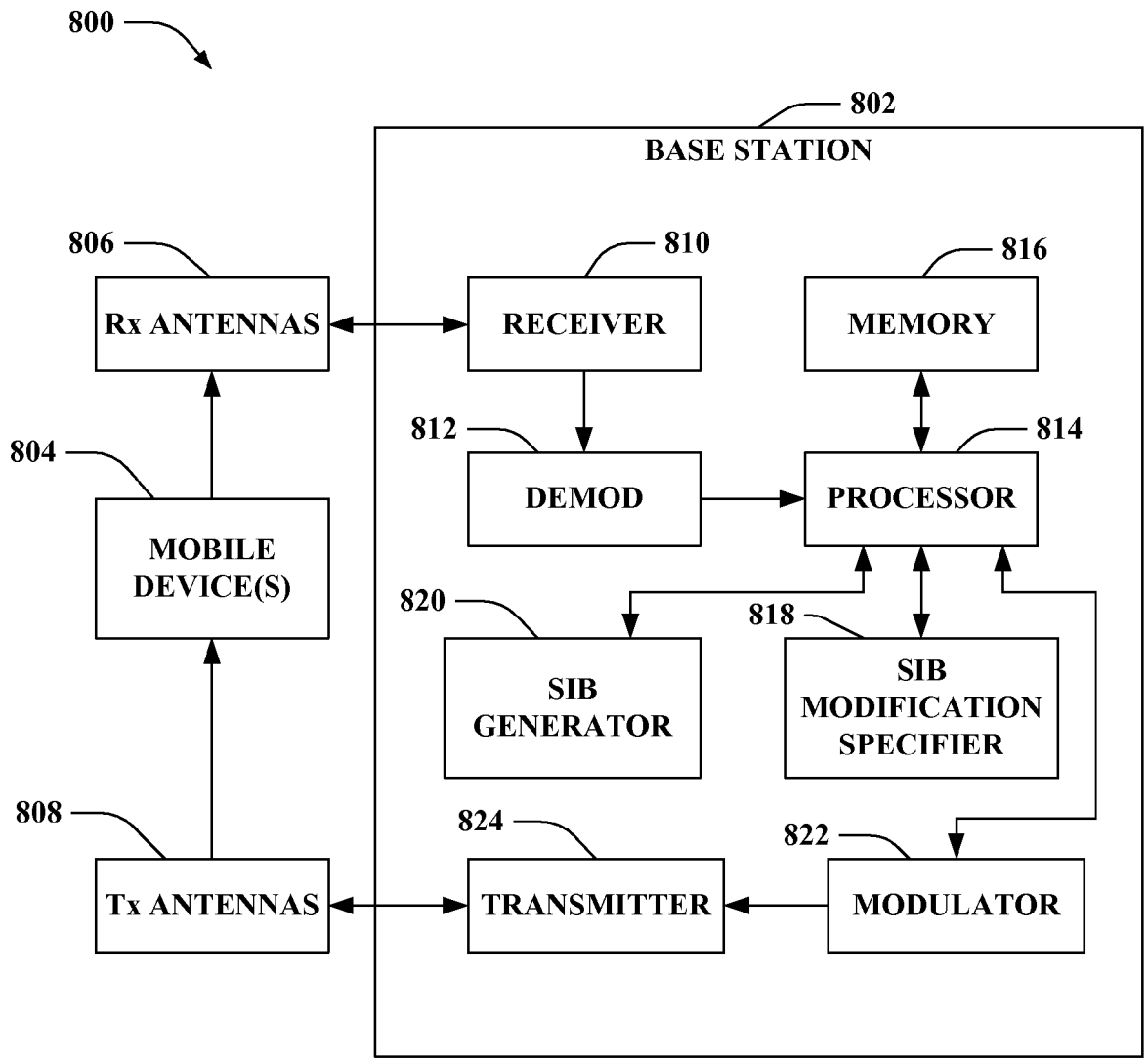
FIG. 8 is an illustration of an example system that notifies devices of SIB modification in a future modification period.

FIG. 8 is an illustration of a system 800 that facilitates indicating SIB modification in a subsequent modification period to one or more mobile devices. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a SIB modification specifier that can determine and indicate a subsequent modification period within which the SIB will be altered and a SIB generator 820 that can create one or more SIBs comprising one or more parameters related to the SIB modification.

According to an example, the SIB modification specifier 818 can determine to modify the SIB and select a subsequent modification period for instantiating the modification. The SIB generator 820 can include information regarding the modification period in a SIB. As described, this can be a flag in the SIB indicating modification in a next modification period, a modification identifier that isolates the modification period in which the modification will occur, and/or the like. Furthermore, although depicted as being separate from the processor 814, it is to be appreciated that the SIB modification specifier 818, SIB generator 820, demodulator 812, and/or modulator 822 can be part of the processor 814 or multiple processors (not shown).

Figure 9:
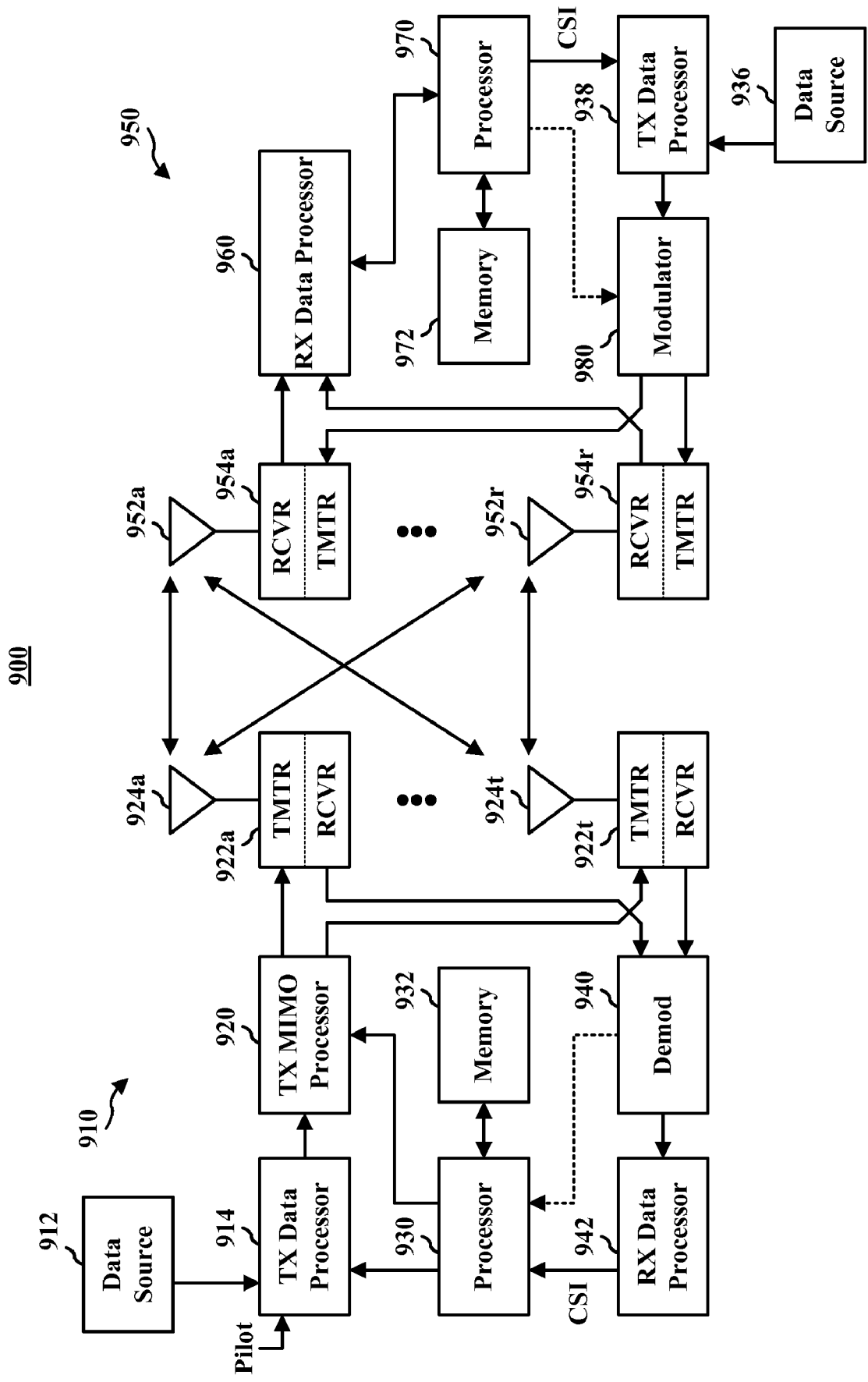
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), examples (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
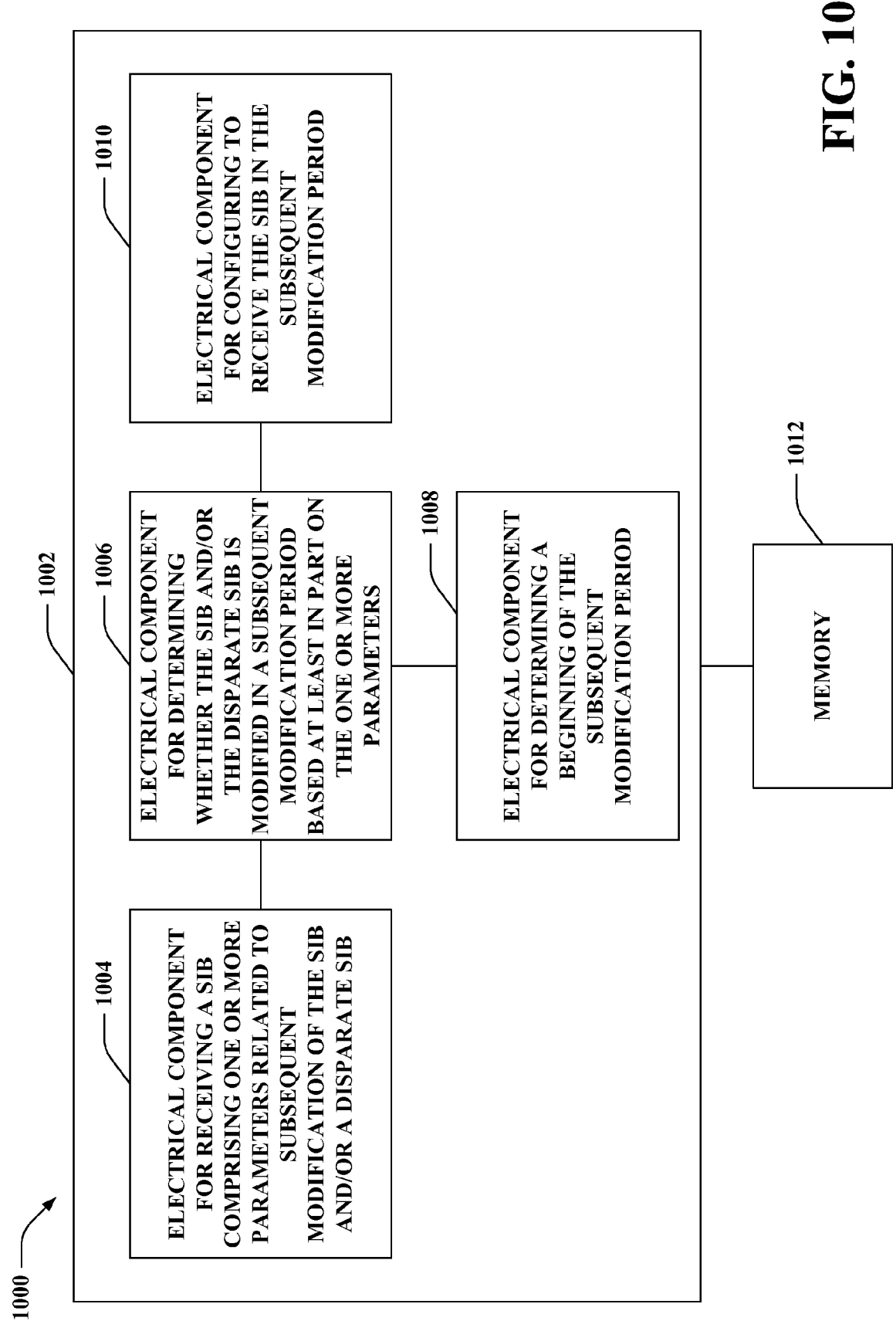
FIG. 10 is an illustration of an example system that detects SIB modification for a subsequent modification period.

With reference to FIG. 10, illustrated is a system 1000 that determines a modification period within which a SIB is modified. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a SIB comprising one or more parameters related to a subsequent modification of the SIB and/or a disparate SIB 1004. For example, the SIB can additionally comprise parameters for communicating with a related access point in an idle mode, as described. Further, logical grouping 1002 can comprise an electrical component for determining whether the SIB is modified in a subsequent modification period based at least in part on the one or more parameters 1006. This can be determined, for example, where the one or more parameters includes a flag that indicates whether the SIB is modified in the next modification period, an explicit indication of the modification period in which the SIB will be modified, and/or the like. Furthermore, logical grouping 1002 can include an electrical component for determining a beginning of the subsequent modification period 1008. This allows the system 1000 to determine the point in time in which the SIB will be modified. In addition, logical grouping 1002 can also comprise an electrical component for configuring the system 1000 to receive the SIB in the subsequent modification period 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
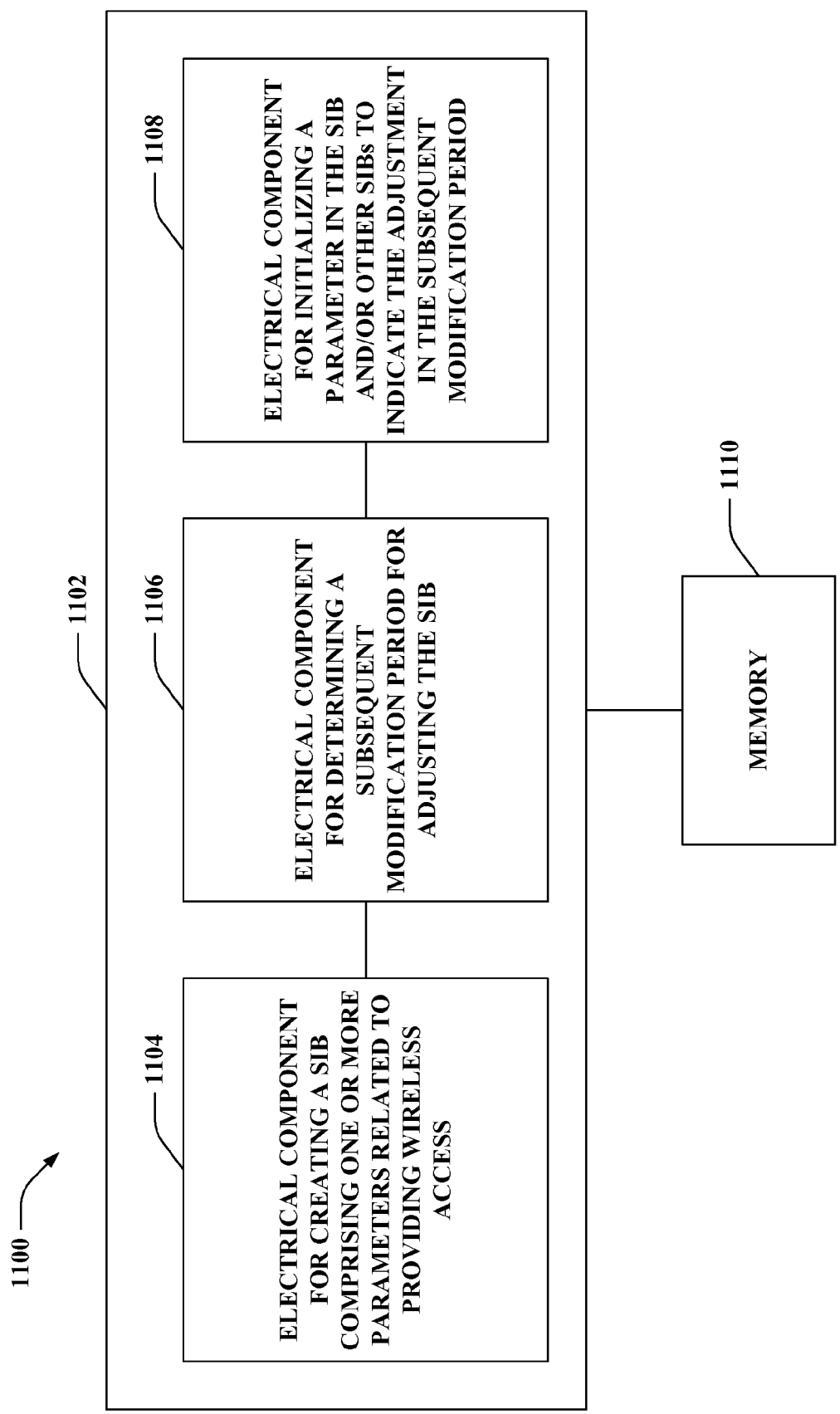
FIG. 11 is an illustration of an example system that indicates SIB modification in a given subsequent modification period.

Turning to FIG. 11, illustrated is a system 1100 that notifies devices of SIB modification in a subsequent modification period by utilizing a SIB transmitted in a current modification period. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that notify of the modification period for altering the SIB. Logical grouping 1102 can include an electrical component for creating a SIB comprising one or more parameters related to providing wireless access 1104. As described, the parameters can relate to system acquisition information, common channel configurations, idle mode mobility parameters, and/or the like. Moreover, logical grouping 1102 can include an electrical component for determining a subsequent modification period for adjusting the SIB 1106. For example, this can be a next modification period or other future period other than the current period. Furthermore, logical grouping 1102 can also include an electrical component for initializing a parameter in the SIB and/or other SIBs to indicate the adjustment in the subsequent modification period 1108. This can ensure devices have current SIB information no matter when the SIB read by the devices, as described. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for detecting subsequent modification of a system information block (SIB), comprising:
    receiving a SIB in a first modification period;
    determining whether the SIB is modified in a second modification period subsequent to the first modification period based at least in part on one or more parameters obtained from the SIB;
    receiving a paging message in a third modification period subsequent to the second modification period; and
    determining whether the SIB is modified in a fourth modification period subsequent to the third modification period based at least in part on information obtained from the paging message.

2. The method of claim 1, further comprising
    receiving a modified SIB in the second modification period when the one or more parameters indicate the SIB is modified in the second modification period.

3. The method of claim 2, further comprising receiving the modified SIB in the second modification period; and utilizing at least one parameter in the modified SIB.

4. The method of claim 2, further comprising
    determining a common channel configuration using parameters of the modified SIB; and
    communicating based on the common channel configuration.

5. The method of claim 1, wherein the receiving the SIB and the determining whether the SIB is modified in the second modification period are performed by a mobile device upon entering a cell in an idle mode.

6. The method of claim 1, wherein the one or more parameters comprise a flag indicating whether the SIB is modified in the second modification period.

7. The method of claim 1, wherein the one or more parameters comprise a numeral identifying the second modification period with respect to the first modification period.

8. A wireless communications apparatus, comprising:
    at least one processor configured to:
        receive a system information block (SIB) in a first modification period;
        determine whether the SIB is modified in a second modification period subsequent to the first modification period based at least in part on one or more parameters obtained from the SIB;
        receive a paging message in a third modification period subsequent to the second modification period; and
        determine whether the SIB is modified in a fourth modification period subsequent to the third modification period based at least in part on information obtained from the paging message; and
    a memory coupled to the at least one processor.

9. The apparatus of claim 8, wherein the at least one processor is configured to:
    receive the SIB and determine whether the SIB is modified in the second modification period in response to a mobile device in an idle mode entering a cell.

10. The apparatus of claim 8, wherein the at least one processor is configured to:
    receive a modified SIB in the second modification period when the one or more parameters indicate the SIB is modified in the second modification period.

11. The apparatus of claim 8, wherein the one or more parameters comprise a flag indicating whether the SIB is modified in the second modification period.

12. A wireless communications apparatus, comprising:
means for receiving a system information block (SIB) in a first modification period;
means for determining whether the SIB is modified in a second modification period subsequent to the first modification period based at least in part on one or more parameters obtained from the SIB;
means for receiving a paging message in a third modification period subsequent to the second modification period; and
means for determining whether the SIB is modified in a fourth modification period subsequent to the third modification period based at least in part on information obtained from the paging message.

13. The apparatus of claim 12, further comprising:
means for receiving the SIB and determining whether the SIB is modified in the second modification period in response to a mobile device in an idle mode entering a cell.

14. The apparatus of claim 12, further comprising:
means for receiving a modified SIB in the second modification period when the one or more parameters indicate the SIB is modified in the second modification period.

15. The apparatus of claim 12, wherein the one or more parameters comprise a flag indicating whether the SIB is modified in the second modification period.

16. A computer program product, comprising:
a non-transitory computer-readable medium comprising:
code for causing at least one computer to receive a system information block (SIB) in a first modification period;
code for causing the at least one computer to determine whether the SIB is modified in a second modification period subsequent to the first modification period based at least in part on one or more parameters obtained from the SIB;
code for causing the at least one computer to receive a paging message in a third modification period subsequent to the second modification period; and
code for causing the at least one computer to determine that the SIB is modified in a fourth modification period subsequent to the third modification period based at least in part on information obtained from the paging message.

17. The computer program product of claim 16, the non-transitory computer-readable medium further comprising:
code for causing the at least one computer to receive the SIB and determine whether the SIB is modified in the second modification period in response to a mobile device in an idle mode entering a cell.

18. The computer program product of claim 16, the non-transitory computer-readable medium further comprising:
code for causing the at least one computer to receive a modified SIB in the second modification period when the one or more parameters indicate the SIB is modified in the second modification period.

19. The computer program product of claim 16, wherein the one or more parameters comprise a flag indicating whether the SIB is modified in the second modification period.

20. An apparatus, comprising:
a system information block (SIB) reader that receives a SIB in a first modification period;
a SIB modification analyzer that determines whether the SIB is modified in a second modification period subsequent to the modification period based at least in part on one or more parameters obtained from the SIB;
a paging channel reader that receives a paging message in a third modification period subsequent to the second modification period, wherein the SIB modification analyzer determines whether the SIB is modified in a fourth modification period subsequent to the third modification period based at least in part on information obtained from the paging message; and
a SIB modification employer that configures the SIB reader to receive the SIB in the second modification period when the one or more parameters indicate the SIB is modified in the second modification period.

21. The apparatus of claim 20, further comprising a modification period boundary detector that determines a beginning of the second modification period.

22. The apparatus of claim 21, wherein the SIB modification employer configures the SIB reader near the beginning of the second modification period.

23. The apparatus of claim 20, wherein the SIB reader receives the SIB in the second modification period.

24. The apparatus of claim 23, wherein the apparatus communicates over a common channel based at least in part on at least one parameter of the SIB received in the second modification period.

25. The apparatus of claim 20, wherein the apparatus communicates with an access point in an idle mode.

26. The apparatus of claim 20, wherein the one or more parameters include a flag that indicates whether the SIB is modified in the second modification period.

27. A method for notifying modification of a system information block (SIB) in a subsequent modification period, comprising:
generating a SIB for transmission in a first modification period and comprising one or more parameters related to modification of the SIB;
determining whether the SIB is modified in a second modification period subsequent to the first modification period;
setting the one or more parameters in the SIB based on whether the SIB is modified in the second modification period;
transmitting the SIB in the first modification period;
generating a paging message for transmission in a third modification period subsequent to the second modification period and comprising information indicative of whether the SIB is modified in a fourth modification period subsequent to the third modification period; and
transmitting the paging message in the third modification period.

28. The method of claim 27, further comprising
transmitting the SIB over a wireless communication network.

29. The method of claim 27, further comprising
modifying the SIB when the SIB is determined to be modified in the second modification period; and
transmitting the modified SIB in the second modification period.

30. The method of claim 27, wherein the one or more parameters include a flag indicating whether the SIB is modified in the second modification period.

31. The method of claim 27, wherein the one or more parameters include an indication of the second modification period in which the SIB is modified.

32. A wireless communications apparatus, comprising:
at least one processor configured to:
create a system information block (SIB) for transmission in a first modification period and comprising one or more parameters related to modification of the SIB;
determine whether the SIB is modified in a second modification period subsequent to the first modification period;
set the one or more parameters in the SIB based on whether the SIB is modified in the second modification period;
send the SIB in the first modification period;
generate a paging message for transmission in a third modification period subsequent to the second modification period and comprising information indicative of whether the SIB is modified in a fourth modification period subsequent to the third modification period; and
send the paging message in the third modification period; and
a memory coupled to the at least one processor.

33. The apparatus of claim 32, wherein the at least one processor is configured to:
modify the SIB when the SIB is determined to be modified in the second modification period; and
transmit the modified SIB in the second modification period.

34. The apparatus of claim 32, wherein the one or more parameters include a flag indicating whether the SIB is modified in the second modification period.

35. A wireless communications apparatus, comprising:
means for creating a system information block (SIB) for transmission in a first modification period and comprising one or more parameters related to modification of the SIB;
means for determining whether the SIB is modified in a second modification period subsequent to the first modification period;
means for setting the one or more parameters in the SIB based on whether the SIB is modified in the second modification period;
means for transmitting the SIB in the first modification period;
means for generating a paging message for transmission in a third modification period subsequent to the second modification period and comprising information indicative of whether the SIB is modified in a fourth modification period subsequent to the third modification period; and
means for transmitting the paging message in the third modification period.

36. The apparatus of claim 35, further comprising:
means for modifying the SIB when the SIB is determined to be modified in the second modification period; and
means for transmitting the modified SIB in the second modification period.

37. The apparatus of claim 35, wherein the one or more parameters include a flag indicating whether the SIB is modified in the second modification period.

38. A computer program product, comprising:
a non-transitory computer-readable medium comprising:
code for causing at least one computer to generate a system information block (SIB) for transmission in a first modification period and comprising one or more parameters related to modification of the SIB;
code for causing the at least one computer to determine whether the SIB is modified in a second modification period subsequent to the first modification period;
code for causing the at least one computer to set the one or more parameters in the SIB based on whether the SIB is modified in the second modification period;
code for causing the at least one computer to send the SIB in the first modification period;
code for causing the at least one computer to generate a paging message for transmission in a third modification period subsequent to the second modification period and comprising information indicative of whether the SIB is modified in a fourth modification period subsequent to the third modification period; and
code for causing the at least one computer to send the paging message in the third modification period.

39. The computer program product of claim 38, the non-transitory computer-readable medium further comprising:
code for causing the at least one computer to modify the SIB when the SIB is determined to be modified in the second modification period; and
code for causing the at least one computer to send the modified SIB in the second modification period.

40. The computer program product of claim 38, wherein the one or more parameters include a flag indicating whether the SIB is modified in the second modification period.

41. An apparatus, comprising:
a system information block (SIB) generator that creates a SIB for transmission in a first modification period and comprising one or more parameters related to modification of the SIB;
a SIB modification specifier that determines whether the SIB is modified in a second modification period subsequent to the first modification period;
a SIB modification instantiator that sets the one or more parameters in the SIB based on whether the SIB is modified in the second modification period; and
a paging generator that generates a paging message for transmission in a third modification period subsequent to the second modification period and sends the paging message in the third modification period, the paging message comprising information indicative of whether the SIB is modified in a fourth modification period subsequent to the third modification period.

42. The apparatus of claim 41, wherein the SIB generator creates and transmits the modified SIB in the second modification period.

43. The apparatus of claim 41, wherein the is one or more parameters comprise a flag indicating whether the SIB is modified in the second modification period.

44. The apparatus of claim 41, wherein the is one or more parameters comprise an indication of the second modification period in which the SIB is modified.

* * * * *